US 7,042,888 B2

(12) United States Patent
Berggreen

(10) Patent No.: US 7,042,888 B2
(45) Date of Patent: May 9, 2006

(54) SYSTEM AND METHOD FOR PROCESSING PACKETS

(75) Inventor: Arthur Berggreen, Santa Barbara, CA (US)

(73) Assignee: Ericsson Inc., Plano, TX (US)

( * ) Notice: Subject to any disclaimer, the term of this patent is extended or adjusted under 35 U.S.C. 154(b) by 832 days.

(21) Appl. No.: 09/962,707

(22) Filed: Sep. 24, 2001

(65) Prior Publication Data

US 2003/0058872 A1 Mar. 27, 2003

(51) Int. Cl.
| H04L 12/28 | (2006.01) |
| H04J 1/16 | (2006.01) |
| H04J 3/14 | (2006.01) |
| G08C 15/00 | (2006.01) |
| C06F 15/173 | (2006.01) |

(52) U.S. Cl. .................. 370/401; 370/235; 370/351; 709/228

(58) Field of Classification Search ........ 370/230–235, 370/328–351, 356, 395–409, 389–392, 411, 370/466–476, 522; 709/212–240, 249–338
See application file for complete search history.

(56) References Cited

U.S. PATENT DOCUMENTS

| 5,307,413 | A | | 4/1994 | Denzer |
| 5,321,606 | A | * | 6/1994 | Kuruma et al. ............... 704/9 |
| 5,732,079 | A | | 3/1998 | Castrigno |
| 5,828,846 | A | * | 10/1998 | Kirby et al. ................ 709/238 |
| 5,946,311 | A | | 8/1999 | Alexander, Jr. et al. .... 370/395 |
| 6,009,097 | A | | 12/1999 | Han ........................... 370/395 |
| 6,016,307 | A | | 1/2000 | Kaplan et al. ............... 370/238 |
| 6,032,197 | A | | 2/2000 | Birdwell et al. |
| 6,104,700 | A | * | 8/2000 | Haddock et al. ............ 370/235 |
| 6,115,372 | A | | 9/2000 | Dinha ........................ 370/352 |
| 6,259,699 | B1 | * | 7/2001 | Opalka et al. ............... 370/398 |
| 6,266,707 | B1 | * | 7/2001 | Boden et al. ............... 709/245 |
| 6,674,743 | B1 | * | 1/2004 | Amara et al. ............... 370/351 |
| 6,678,248 | B1 | * | 1/2004 | Haddock et al. ............ 370/235 |
| 2002/0188732 | A1 | * | 12/2002 | Buckman et al. ........... 709/228 |
| 2003/0009585 | A1 | * | 1/2003 | Antoine et al. ............. 709/238 |
| 2003/0014540 | A1 | * | 1/2003 | Sultan et al. ............... 709/240 |
| 2003/0084078 | A1 | * | 5/2003 | Torii et al. .................. 707/513 |
| 2004/0081093 | A1 | * | 4/2004 | Haddock et al. ............ 370/230 |

OTHER PUBLICATIONS

Cisco: "policy-based routing" Policy-Based Routing, Online! Jul. 3, 2000, pp. 1-5, XP002241435 Retrieved from the Internet: URL:http:/www.cisco.com/warp/public/cc/techno/protocol/plicy_wp.htm retrieved on May 16, 2003! p. 1, line 29—p. 3, line 38.

(Continued)

Primary Examiner—Man U. Phan

(57) ABSTRACT

The present invention provides a system and method for processing packetized data or packets through a communications switch using a Fast Flow-Forwarding ("FFF") system. FFF provides expedited forwarding of packets based on pattern matching and data manipulation rules that cross protocol layer boundaries. More specifically, the present invention provides a method for processing a packet in which the packet is received and processed using one or more transformation rules whenever the packet satisfies one or more identification rules. Otherwise, the packet is processed using a standard process whenever the packet does not satisfy the one or more identification rules. This method can be implemented using a computer program having a code segment to execute each step of the method.

48 Claims, 5 Drawing Sheets

OTHER PUBLICATIONS

Yang B et al: "Design, Simulation and Evaluation of TCP Switch" XP002202297 Retrieved from the Internet: URL: http://www.stanford.edu/class/cs344/staff/group1/final_report.ps retrieved on Jun. 14, 2002! The whole document.

* cited by examiner

SYSTEM AND METHOD FOR PROCESSING PACKETS

FIELD OF THE INVENTION

The present invention relates generally to the field of communications and, more particularly, to a system and method for processing packets.

BACKGROUND OF THE INVENTION

The increasing demand for data communications has fostered the development of techniques that provide more cost-effective and efficient means of using communication networks to handle more information and new types of information. One such technique is to segment the information, which may be a voice or data communication, into packets. A packet is typically a group of binary digits, including at least data and control information. Integrated packet networks (typically fast packet networks) are generally used to carry at least two (2) classes of traffic, which may include, for example, continuous bit-rate ("CBR"), speech ("Packet Voice"), data ("Framed Data"), image, and so forth. Packet networks source, sink and/or forward protocol packets. Each packet has a well-defined format and consists of one or more packet headers and some data. The header typically contains information that gives control and/or address information, such as the source and destination of the packet.

Packet header creation typically requires a significant amount of system resources, such as a central processing unit ("CPU") and/or a switch. As a result, the throughput of a communications switch is limited or constrained by the capacity of the CPU within the switch and the other processing functions that the CPU must also provide. Such processing constraints cause congestion and Quality of Service ("QoS") problems inside the switch. In addition, throughput of the switch is primarily determined by the capacity of the switch fabric. Moreover, much of the switch's processing capacity is devoted to processing the packet headers, which typically do not vary greatly between consecutive packets. As a result, the throughput of the switch is limited by the number of packets that it can process, despite the fact that the processing is often repetitive. Accordingly, there is a need for a system and method for processing packets to increase the throughput of the switch.

SUMMARY OF THE INVENTION

The present invention provides a system and method for processing packetized data or packets through a communications switch using a Fast Flow-Forwarding ("FFF") system. FFF provides expedited forwarding of packets based on pattern matching and data manipulation rules that cross protocol layer boundaries. FFF can be implemented in many protocol environments to increase the efficiency of the switch by identifying packets associated with a particular flow. A flow is a stream of correlated packets originating from a specific source and being delivered to one or more specific destinations. Typically, these flows will have the same source and destination addresses, and other criteria in common, originating from a single client-server session.

The present invention provides a method for processing a packet in which the packet is received and processed using one or more transformation rules whenever the packet satisfies one or more identification rules. Otherwise, the packet is processed using a standard process whenever the packet does not satisfy the one or more identification rules. This method can be implemented using a computer program having a code segment to execute each step of the method.

In addition, the present invention provides a communications switch having one or more ingress cards, one or more control cards, one or more egress cards, and a communications bus. The communications bus communicably couples the ingress cards, the control cards and the egress cards together. Each control card has at least one processor. Moreover, each ingress card receives one or more packets, processes each packet using one or more transformation rules whenever the packet satisfies one or more identification rules, and sends each packet to one of the processors for processing using a standard process whenever the packet does not satisfy the one or more identification rules.

The present invention also provides a communications switch having one or more ingress cards, one or more control cards, one or more signal processing cards, one or more egress cards, a switch fabric and a TDM bus. Each control card has at least one processor. Moreover, each signal-processing card contains an array of digital signal processors. Each digital signal processor creates one or more packets and sends the one or more packets to a fast flow forwarding engine. Each fast flow forwarding engine receives the one or more packets, processes each packet using one or more transformation rules whenever the packet satisfies one or more identification rules, and sends each packet to one of the processors for processing using a standard process whenever the packet does not satisfy the one or more identification rules. The switch fabric communicably couples the ingress cards, the signal processing cards, the control cards and the egress cards together. The TDM bus communicably couples the ingress cards, the signal processing cards, the control cards and the egress cards.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

Figure 1:
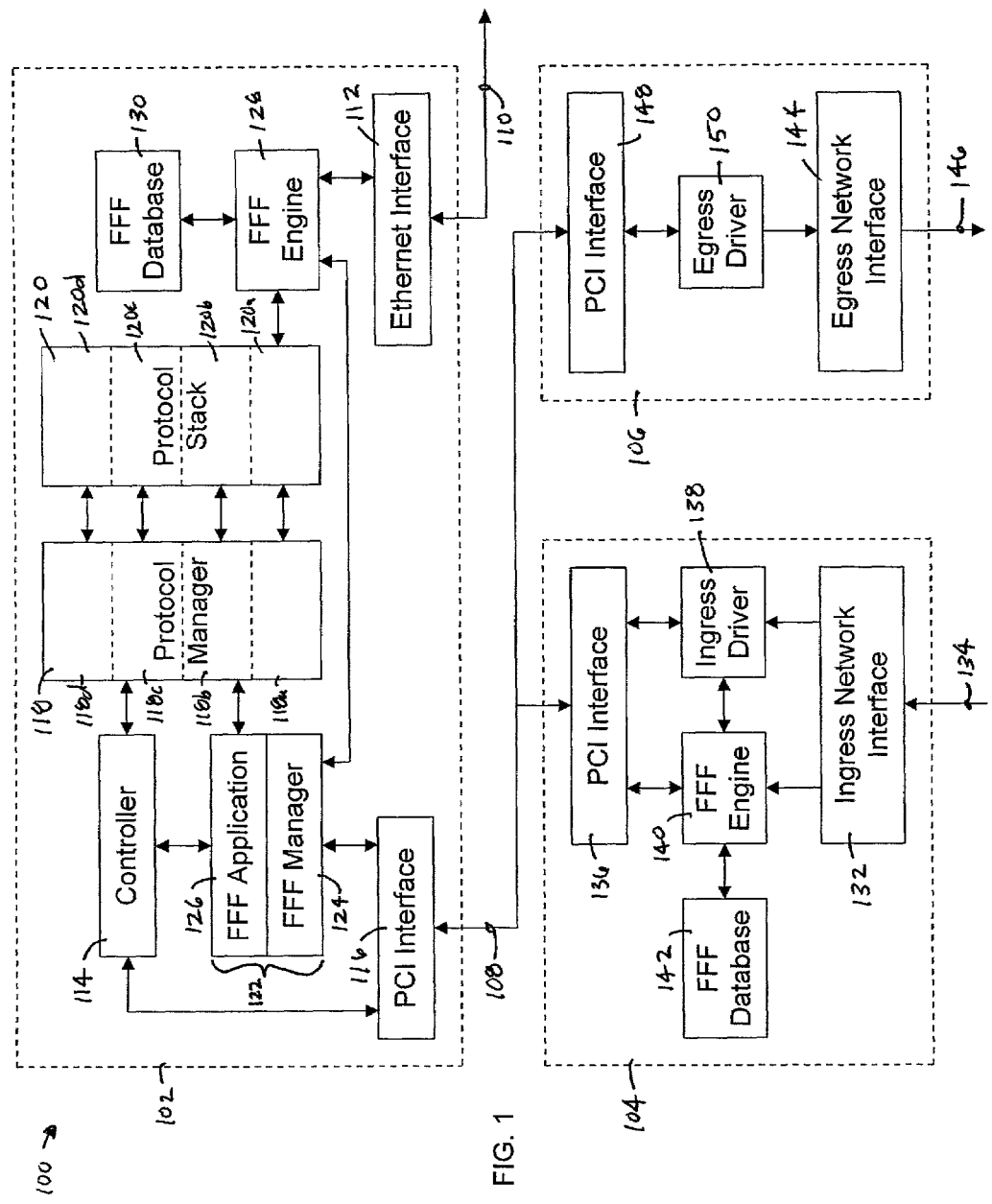
FIG. 1 is a block diagram of one embodiment of a communications switch in accordance with the present invention.

While the making and using of various embodiments of the present invention are discussed in detail below, it should be appreciated that the present invention provides many applicable inventive concepts, which can be embodied in a wide variety of specific contexts. For example, in addition to telecommunications systems, the present invention may be applicable to other forms of communications or general data processing. Other forms of communications may include communications between networks, communications via satellite, or any form of communications not yet known to man as of the date of the present invention. The specific embodiments discussed herein are merely illustrative of specific ways to make and use the invention and do not limit the scope of the invention.

The present invention provides a system and method for processing packetized data or packets through a communications switch using a Fast Flow-Forwarding ("FFF") system. FFF provides expedited forwarding of packets based on pattern matching and data manipulation rules that cross protocol layer boundaries. FFF can be implemented in many protocol environments to increase the efficiency of the switch by identifying packets associated with a particular flow. A flow is a stream of correlated packets originating from a specific source and being delivered to one or more specific destinations. Typically, these flows will have the same source and destination addresses, and other criteria in common, originating from a single client-server session.

For example, in the case of voice over Internet protocol ("VoIP"), a voice conversation would be comprised of many Internet Protocol ("IP") packets with different data. VoIP is the ability to make telephone calls and send faxes over IP-based data networks. An integrated voice/data network allows more standardization and reduces total equipment needs. VoIP can support multimedia and multi-service applications. However, all packets associated with a specific conversation typically have the same or similar header information, and can thus be described as a flow. Once the present invention detects a flow, and the standard processing steps are recorded, the same processing treatment can be defined by a few general rules that can be applied by relatively simple and unintelligent (protocol-unaware) devices. On the other hand, in standard processing systems (conventional protocol processing), the IP packets associated with a particular flow are individually switched based on a layered protocol software process referred to as the protocol stack. However, this method decreases the efficiency of a switch because each individual packet is similarly processed through the switch's processors, thereby reducing the system throughput and/or introducing unacceptable packet latency. By avoiding the layered protocol processing of the standard processing path for the remainder of the flow, a switch using FFF of the present invention allows significantly higher throughput for those packets identified as part of a flow.

IP specifies the format of packets, also called datagrams, and the addressing scheme. Most networks combine IP with a higher-level protocol. One such protocol is called Transport Control Protocol ("TCP"), which establishes a virtual connection between a destination and a source. IP allows a packaged to be addressed and dropped in a system, but there is no direct link between the sender and the recipient. TCP/IP, on the other hand, establishes a connection between two hosts so that they can send messages back and forth for a period of time.

Another IP packet header is the real time transport protocol ("RTP"), which is an Internet standard for the transport of real time data, including audio and video. RTP is used to identify packets as containing a voice sampling in a particular encoding format. A timestamp and sequence number are typically used to reassemble a synchronous voice stream from a stream of RTP packets. RTP can also be used for media on demand services and interactive services like IP telephony. On the other hand, user datagram protocol ("UDP") header provides efficient but unreliable (nonguaranteed) transport of data. It is used for the transport of real-time voice data since retransmission of real-time data would add too much delay to the voice conversation. IP, however, provides a standard encapsulation of data for transmission over the network. It contains a source and destination address used for routing. MAC performs management functions and handles address resolution protocol ("ARP") for the device.

Now referring to FIG. 1, a block diagram of one embodiment of a communications switch 100 in accordance with the present invention is shown. The switch 100 includes one or more control cards 102, one or more ingress cards 104 and one or more egress cards 106. The control cards 102, ingress cards 104 and egress cards 106 are communicably coupled to one another through a communications bus 108, such as a peripheral component interconnect ("PCI") bus. Control cards 102 are also communicably coupled to an Ethernet connection 110 via Ethernet interface 112.

Control cards 102 include one or more CPUs or controllers 114 communicably coupled to the PCI interface 116, which allows access to the PCI bus 108. The controller 114 is communicably coupled to a protocol manager 118, which contains one or more agents that process packets at each level of the protocol stack 120. As a result, there is at least one protocol manager 118 and protocol stack 120 for each type of protocol being processed by the control card. 102. For example, an IP protocol stack would include, from bottom to top, an Ethernet layer 120a, an IP layer 120b, a UDP layer 120c and a RTP layer 120d. Similarly, the protocol manager 118 has a corresponding layer manager 118a, 118b, 118c and 118d for each layer of the protocol stack 120. The number of protocol layers and layer managers will depend on the protocol being processed. The controller 114, protocol manager 118 and protocol stack 120 provide the standard protocol processing for the present invention.

The control cards 102 of the present invention also include a FFF controller 122, which includes at least one instance of a FFF manager 124 and a FFF application 126. The FFF controller 122 is communicably coupled to the controller 114, the PCI interface 116 and the protocol manager 118. The operation of the FFF controller 122, FFF manager 124 and FFF application 126 will be described in more detail in reference to FIG. 2. The control cards 102 may also include a FFF engine 128 communicably coupled to the Ethernet interface 112, the protocol stack 120, the FFF controller 122 and a FFF database 130. The operation of the FFF engine 128 and the FFF database 130 will be described in more detail in reference to FIG. 3. Otherwise, the protocol stack 120 is communicably coupled to the Ethernet interface 112.

The one or more ingress cards 104 include an ingress network interface 132 for receiving communications 134, a PCI interface 136 communicably coupled to the PCI bus 108 and an ingress driver 138 communicably coupled to the ingress network interface 132 and PCI interface 136. The ingress cards 104 also include one or more FFF engines 140 communicably coupled to the ingress network interface 132, the PCI interface 136, the ingress driver 138 and a FFF database 142. The operation of the FFF engine 140 and the FFF database 142 will be described in more detail in reference to FIG. 3. The one or more egress cards 106 include an egress network interface 144 for receiving communications 146, a PCI interface 148 communicably coupled to the PCI bus 108 and an egress driver 150 communicably coupled to the egress network interface 144 and PCI interface 148.

The one or more FFF applications 126 monitor the protocol manager 118 and protocol stack 120 to detect new flows and changes in existing flows. The FFF applications 126 work with the layer manager(s) 118*a–d* to detect, create and delete identification, validation, and/or transformation rules for a particular flow. The FFF applications 126 are configured to build a complete set of flowset rules, which may include one or more identification rules, one or more validation rules, and/or one or more transformation rules, for installation in an FFF engine, such as 128 or 140. The FFF manager 124 handles the management interface for the FFF system and controls communication between the FFF applications 126 and the FFF engines 128 and 140. Furthermore, the FFF manager 124 accepts flow addition, deletion, and/or query requests from the FFF applications 126 and translates the request(s) into a format understood by the FFF engine 128 and 140. Additionally, the flow manager 124 communicates identification, validation, and/or transformation rules to the FFF engine 128 and 140, which stores the rules in the FFF database 130 and 142, respectively. A FFF database manager (not shown) controls the FFF database 130 and 142. The FFF engine 128 and 140, and the FFF database manager (not shown) are provided as one or more library routines to any driver, such as ingress driver 138, that is configured to participate in FFF. The library routine(s) are implemented in software or are hardware-accelerated.

The FFF database manager (not shown) stores the identification, validation, and/or transformation rules as decision tree to facilitate fast frame processing by the FFF engine 128 and 140. The decision tree includes one or more nodes wherein each node is a hash table. The use of hash tables in decision trees are well known to those skilled in the art. Additionally, the FFF engine 128 and 140 determine whether a packet is part of an identified flow by matching an incoming frame to existing flow patterns, which are stored as one or more identification rules stored in the FFF database 130 and 142. The one or more identification rules may include a sequence of data patterns, data masks, and/or relative offsets of the IP data packets that uniquely identify the IP data packets as belonging to a specific flow. The FFF engine 128 and 140 may also validate the incoming frame using one or more validation rules stored in the FFF database 130 and 142. The one or more validation rules are used to further verify that the packet qualifies for FFF. If the packet is successfully identified and validated, the FFF engine 128 and 140 processes it using one or more transformation rules stored in the FFF database 130 and 142. Typically, a final transformation rule contains an identification of an output interface for the transformed packets to be transmitted out. Once transformed, the packet is sent directly to the egress card 106 via PCI bus 108 and PCI interfaces 136 and 148. If, however, the system contains an egress port that co-exists on a same printed circuit board as the FFF engine 128 and 140, the packet can be sent directly to the egress port.

Upon initialization of the system, the FFF database 130 and 142 (decision tree) is typically empty. Following initialization of the system, the database 130 and 142 (decision tree) may be loaded with stored information. If the stored database information is unavailable or does not exist, the FFF engine 128 and 140 defaults to routing the packets associated with a particular flow to the protocol stack 120 for standard processing until the FFF database 130 and 142 are loaded with the flowset. Furthermore, the FFF database 130 and 142 (decision tree) is modified dynamically as the flowset is added, modified and removed from FFF engine 128 and 140.

Figure 2:
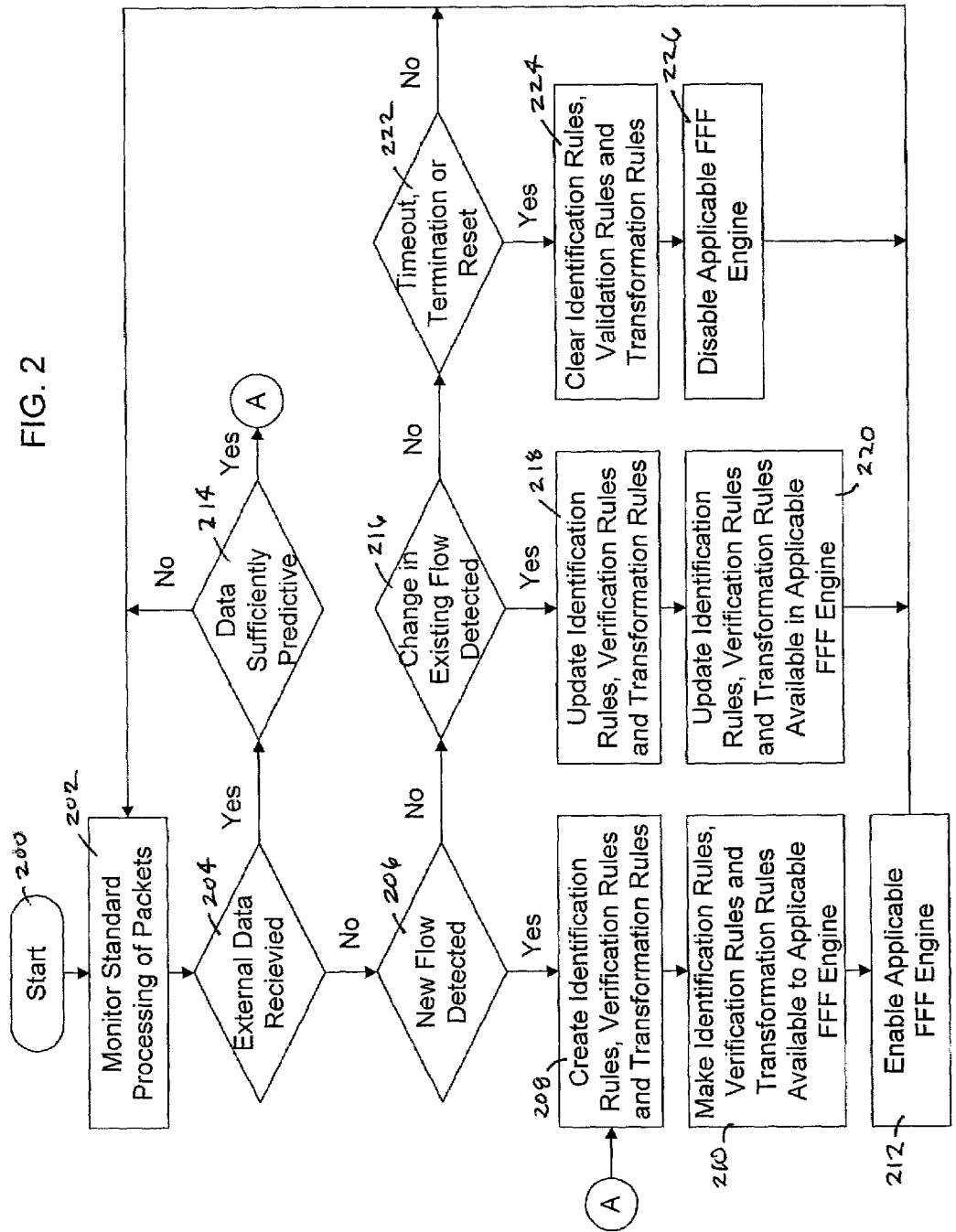
FIG. 2 is a flowchart of a fast flow-forwarding controller in accordance with the present invention.

Referring now to both FIGS. 1 and 2, FIG. 2 depicts a flowchart of a fast flow-forwarding controller in accordance with the present invention. The process for creating, updating and deleting the flowset rules (identification, verification and transformation) starts in block 200. The FFF controller 122, and more specifically, the one or more FFF applications 126, monitors the standard processing of packets in the protocol stack 120 by the protocol manager 118 in block 202. If the FFF controller 122 has not received any external data, such as call set-up information, as determined in decision block 204, and a new flow has been detected, as determined in decision block 206, the one or more identification rules, one or more verification or validation rules and the one or more transformation rules are created in block 208. The FFF manager 124 then makes the flow set rules (one or more identification rules, one or more verification or validation rules and the one or more transformation rules) available to the FFF Engine 128 or 140 that is handling the detected flow in block 210. As a result, the FFF Engine 128 or 140 is enabled in block 212. Thereafter, the FFF controller 122 continues to monitor the standard processing of packets via the FFF applications 126 in block 202.

If, however, the FFF controller 122 receives external data, such as call set-up information, as determined in decision block 204, and the external data is sufficiently predictive to allow prior creation of the flowset rules for the call, as determined in decision block 214, the flow set rules (one or more identification rules, one or more verification or validation rules and the one or more transformation rules) are created in block 208 and the process continues as previously described. If, however, the external data is not sufficiently predictive to allow prior creation of the flowset rules for the call, as determined in decision block 214, the FFF controller 122 continues to monitor the standard processing of packets via the FFF applications 126 in block 202.

If, however, a new flow has not been detected, as determined in decision block 206, but a change in an existing flow has been detected, as determined in decision block 216, the one or more identification rules, one or more verification or validation rules and the one or more transformation rules are updated in block 218. The FFF manager 124 then makes the updated flow set rules (one or more identification rules, one or more verification or validation rules and the one or more transformation rules) available to the FFF Engine 128 or 140 that is handling the detected flow in block 220. Thereafter, the FFF controller 122 continues to monitor the standard processing of packets via the FFF applications 126 in block 202.

If, however, a change in an existing flow has not been detected, as determined in decision block 216, but a timeout, termination or reset condition has been detected, as determined in decision block 222, the one or more identification rules, one or more verification or validation rules and the one or more transformation rules are cleared or deleted in block 224. As a result, the applicable FFF Engine 128 or 140 is disabled in block 226. Thereafter, the FFF controller 122 continues to monitor the standard processing of packets via the FFF applications 126 in block 202.

Figure 3:
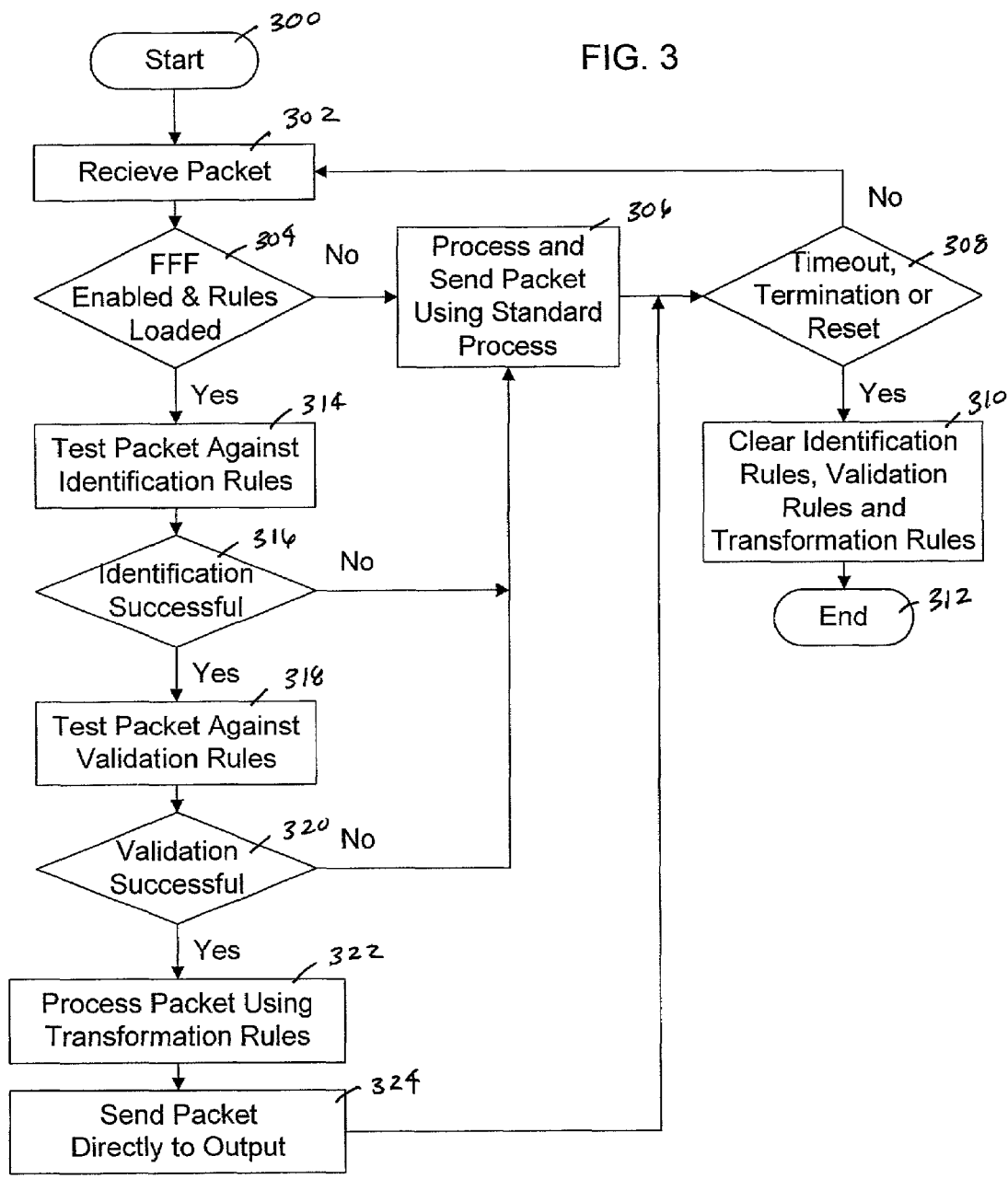
FIG. 3 is a flowchart of a fast flow-forwarding engine in accordance with the present invention.

Now referring both to FIGS. 1 and 3, FIG. 3 depicts a flowchart of a fast flow-forwarding engine in accordance with the present invention. The FFF engine 128 or 140 processing of packets starts in block 300. The FFF engine 128 or 140 receives the packet in block 302. If the FFF engine 128 or 140 is disabled or the flowset rules are not loaded in the FFF database 130 or 142, as determined in decision block 304, the packet is processed and sent using the standard process in block 306. This means that the packet is sent to the protocol stack 120 for processing. Thereafter, if the FFF engine 128 or 140 receives a timeout, termination or reset condition, as determined in decision block 308, the one or more identification rules, one or more verification or validation rules and the one or more transformation rules are cleared or deleted in block 310 and the FFF Engine 128 or 140 process ends in block 312. As a result, the applicable FFF Engine 128 or 140 is disabled.

If, however, the FFF engine 128 or 140 is enabled and the flowset rules are loaded in the FFF database 130 or 142, as determined in decision block 304, the packet is tested against the one or more identification rules in block 314. If the identification process is not successful, as determined in decision block 316, the packet is processed and sent using the standard process in block 306 and the process continues are previously described. This means that the packet is sent to the protocol stack 120 for processing. If, however, the identification process is successful, as determined in decision block 316, the packet is tested against the one or more validation or verification rules in block 318. If the validation or verification process is not successful, as determined in decision block 320, the packet is processed and sent using the standard process in block 306 and the process continues are previously described. This means that the packet is sent to the protocol stack 120 for processing. If, however, the validation or verification process is successful, as determined in decision block 320, the packet is processed using the one or more transformation rules in block 322 and the processed or transformed packet is sent directly to the assigned egress port in block 324. Thereafter, the process loops back to decision block 308, as previously described, and most likely receives the next packet in block 302 and repeats the process.

Figure 4:
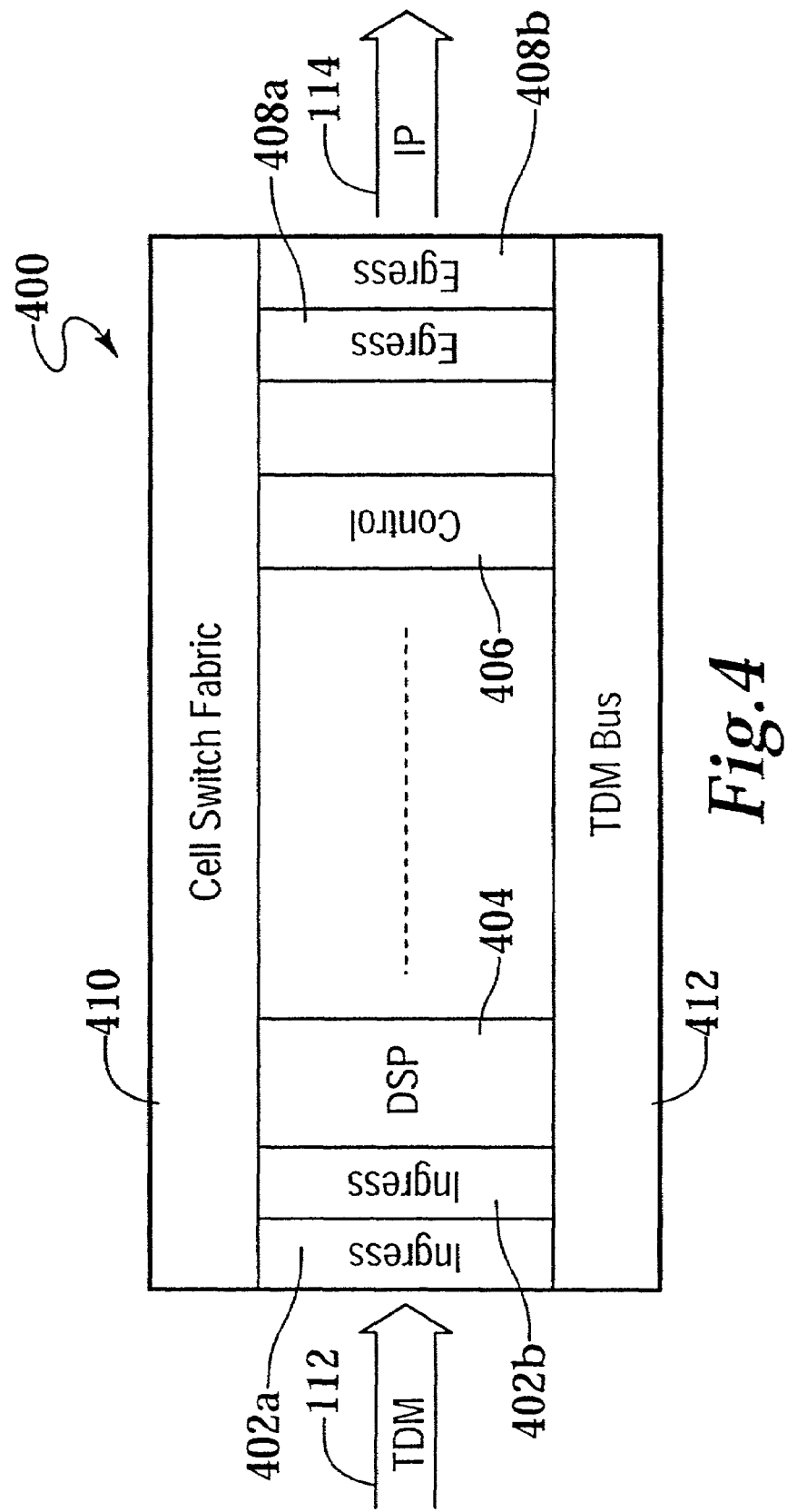
FIG. 4 is a diagram of a packet network switch in accordance with one embodiment of the present invention.

Now referring to FIG. 4, a communications switch 400 in accordance with the present invention will now be described. The packet network switch 400 can be used to process VoIP, voice over Frame Relay ("VoFR") and other types of calls. Moreover, the packet network switch 400 is similar to an asynchronous transfer mode ("ATM") switch. ATM is a connection-oriented technology used in both local area network ("LAN") and wide area network ("WAN") environments. It is a fast-packet switching technology that allows free allocation of capacity to each channel. Packet network switch 400 includes one or more ingress cards 402a and 402b, one or more signal processing cards 404, one or more control cards 406, one or more egress cards 408a and 408b, a switch fabric 410 and a TDM bus 412. Each signal-processing card 404 contains an array of digital signal processors ("DSP") (not shown) and each control card 406 contains one or more processors (not shown). The switch fabric 410 communicably couples the ingress cards 402, the signal processing cards 404, the control cards 406 and the egress cards 408 together. The TDM bus 412 also communicably couples the ingress cards 402, the signal processing cards 404, the control cards 406 and the egress cards 408 together. Preferably cards 402, 404, 406 and 408 can be inserted in any order within packet network switch 400. Moreover, the packet network switch 400 should include sufficient numbers of redundant cards to serve as backup cards in the event a card 402, 404, 406 and 408 fails.

The main function of a packet network switch 400 is to relay user data cells from input ports to the appropriate output ports. When a call or communication is to be handled by the packet network switch 400, a network controller (not shown) provides the control card 408 with the necessary call set-up information. Control card 408 uses this call set-up information to assign a port in ingress cards 402a or 402b to receive the call from the Public Switched Telephone Network ("PSTN"), a DSP within processing card 404 to process the call, and a port in egress cards 408a or 408b to send the call to IP network (not shown). Each control card 408 has its own memory and thus avoids the typical problems associated with shared memory, such as recursive calls and synchronization and corruption problems. The TDM-based communications or messages enter through ingress cards 402a or 402b and are routed to the appropriate processing card 404 through TDM Bus 412. The DSPs in processing card 404 convert messages between analog and digital information formats, and provide digital compression and switching functions. In one embodiment, each processing card 404 is capable of processing 1024 simultaneous sessions. The processing card 404 then sends the messages from the DSP to cell switch fabric 410, which is primarily responsible for the routing and transferring of messages or data cells, the basic transmission unit, between switch elements. The switch fabric 410 may also provide cell buffering, traffic concentration and multiplexing, redundancy for fault tolerance, multicasting or broadcasting, and cell scheduling based on delay priorities and congestion monitoring. Switch fabric 410 ultimately routes the messages to egress cards 408a or 408b. In one embodiment, each egress card 408 is capable of handling at least 8000 calls. Egress cards 408a and 408b typically send the messages to a gigabit Ethernet (not shown). As its name indicates, the gigabit Ethernet supports data rates of one (1) gigabit (1,000 megabits) per second.

Figure 5:
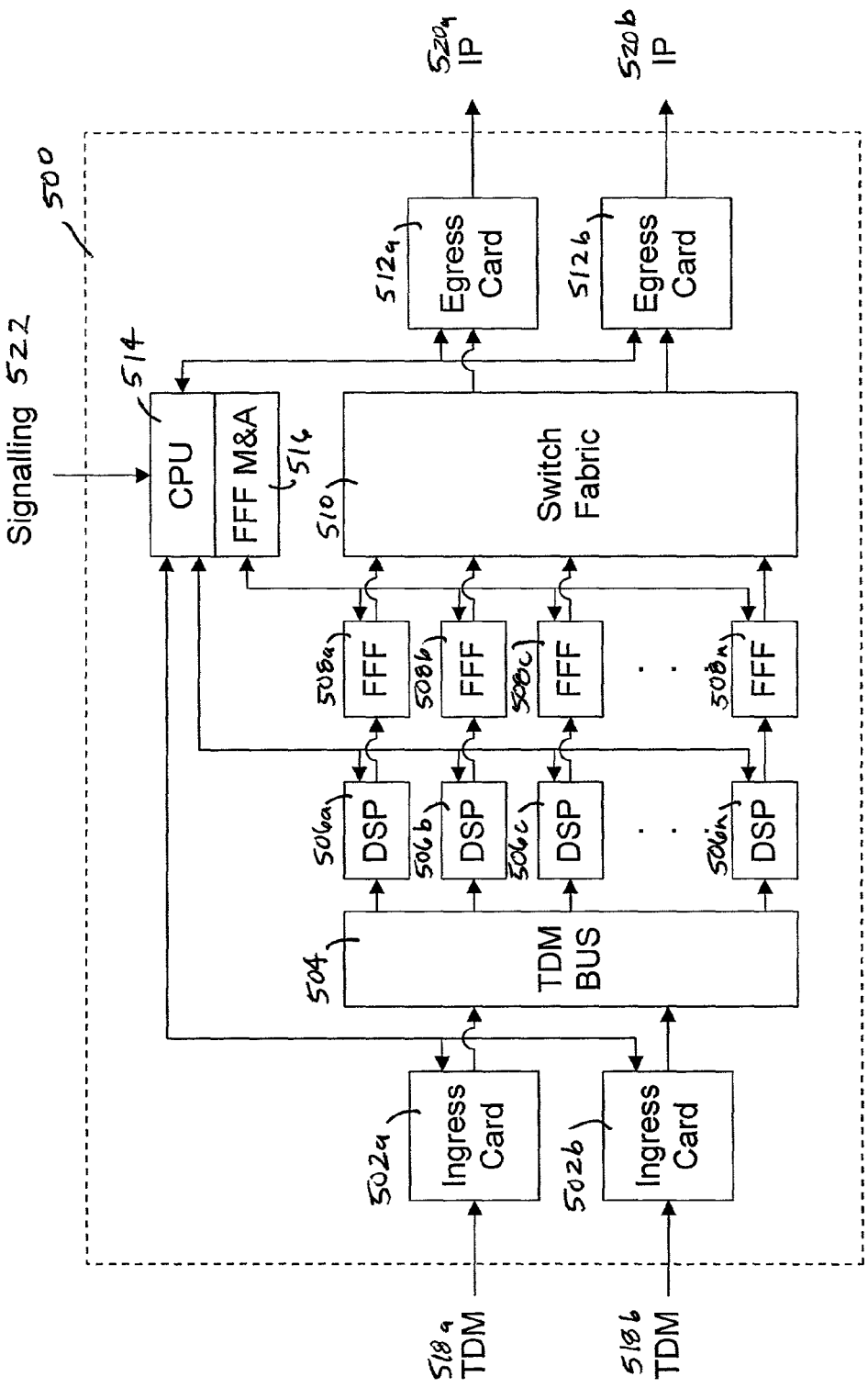
FIG. 5 is a schematic diagram of a packet network switch in accordance with one embodiment of the present invention.

Referring now to FIG. 5, a schematic diagram of a packet network switch 500 in accordance with one embodiment of the present invention is shown. The packet network switch 500 includes ingress cards 502a and 502b communicably coupled to a TDM bus 504. The TDM bus 504 is communicably coupled to a number of DSPs 506a, 506b, 506c . . . 506n. The DSPs 506a, 506b, 506c . . . 506n are typically configured in an array of DSPs located on one or more signal processing cards. Each DSP 506a, 506b, 506c . . . 506n is communicably coupled to a FFF engine 508a, 508b, 508c . . . 508n, each of which has a FFF database (not shown) as previously described. Each FFF engine 508a, 508b, 508c . . . 508n is communicably coupled a switch fabric 510. The switch fabric 510 is communicably coupled to egress cards 512a and 512b. Packet network switch 500 also includes one or more CPUs 514, which are typically located on one or more control cards. The CPU 514 is communicably coupled to the ingress cards 502a and 502b, the DSPs 506a, 506b, 506c . . . 506n, and the egress cards 512a and 512b. A FFF controller 516, which includes a FFF manager (not shown) and one or more FFF applications (not shown), is communicably coupled to the CPU 514 and the FFF engines 508a, 508b, 508c . . . 508n.

During the conversion of a time division multiplexed ("TDM") based communication 518a or 518b to an IP-based communication 520a or 520b, the CPU 514 receives signaling instructions 522 for the call and assigns an ingress card 502a, 502b port, and egress card 510a, 510b port, and a DSP 506a, 506b, 506c . . . 506n to process the call. Similarly, the FFF controller 516 (FFF manager) assigns a FFF engine 508a, 508b, 508c . . . 508n to process the packed after it is created by the respective DSP 506a, 506b, 506c . . . 506n. The DSP 506a, 506b, 506c . . . 506n receives call set-up information from the CPU 514 and requests an overlay from the CPU 514 based on the call set-up information or bearer type. The DSP 506a, 506b, 506c . . . 506n receives and loads the overlay. The overlay contains the necessary operating parameters to properly configure the DSP 506a, 506b, 506c . . . 506n to process a certain type of call. The real-time loading of overlays allows each DSP 506a, 506b, 506c . . . 506n to process any call type. The use of overlays also allows the packet network switch 500 to be updated to process new call types or more efficiently process existing call types via software updates or downloads. In addition, the packet network switch 500 can use the allocation of overlays to dynamically control the allocation of bandwidth to the various call types to ensure QoS standards and/or compliance with licensing restrictions.

Next, the DSP 506a, 506b, 506c . . . 506n processes the pulse code modulated ("PCM") data and performs further discrimination of the data to determine whether a different overlay is required. If the overlay needs to be changed, the DSP 506a, 506b, 506c . . . 506n requests a different overlay, and receives and loads the different overlay. For example, the call set-up information may indicate that the bearer type of the call is voice even though the bearer type may actually be either voice or fax. Thus, if the DSP 506a, 506b, 506c . . . 506n recognizes through further discrimination of the PCM data that the call is actually a fax instead of a voice call, the DSP 506a, 506b, 506c . . . 506n will request a different overlay so as to properly configure the DSP 506a, 506b, 506c . . . 506n to process the fax.

Once the proper overlay is loaded, the DSP 506a, 506b, 506c . . . 506n receives the call data from the assigned ingress card 502a, 502b port via the TDM bus 504. The DSP 506a, 506b,506c . . . 506n then compresses the call data and creates a data portion of the packet. The DSP 506a, 506b, 506c . . . 506n may also create one or more digital samples from the compressed call data and create the data portion of the packet using the one or more digital samples. The DSP 506a, 506b, 506c . . . 506n also creates one or more headers, such as a RTP header, a UDP header, an IP header and a MAC header, using the call data and the call set-up information. More specifically, the RTP and UDP headers are generated from the call data while the IP and MAC headers are generated from the call set-up information. Note that the DSP 506a, 506b, 506c . . . 506n is not limited to the creation of any specific headers, such as a RTP header, a UDP header, an IP header or a MAC header, but can be used to create any header necessary for proper delivery of a packet.

The DSP 506a, 506b, 506c . . . 506n then attaches the one or more headers to the data portion of the packet. The DSP 506a, 506b, 506c . . . 506n sends the complete packet (data plus headers) to the assigned FFF engine 508a, 508b, 508c . . . 508n. The assigned FFF engine 508a, 508b, 508c . . . 508n processes the packet using one or more transformation rules whenever the packet satisfies one or more identification rules and/or verification or validation rules. Otherwise, the assigned FFF engine 508a, 508b, 508c . . . 508n processes the packet using a standard process whenever the packet does not satisfy the one or more identification rules and/or verification or validation rules. The standard process is described above in reference to FIG. 1. The FFF processes are described above in reference to FIGS. 1–3. The processed packet is then sent to the appropriate egress card 512a, 512b port via the switch fabric 510 for transmission out over the IP network.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for processing a packet comprising the steps of:
    monitoring the standard process to detect one or more packet flows;
    creating the one or more identification rules and the one or more transformation rules whenever a packet flow is detected;
    receiving the packet;
    processing the packet using one or more transformation rules whenever the packet satisfies one or more identification rules; and
    processing the packet using a standard process whenever the packet does not satisfy the one or more identification rules.

2. The method as recited in claim 1, wherein the one or more identification rules further comprise one or more validation rules.

3. The method as recited in claim 1, further comprising the step of creating the one or more identification rules and the one or more transformation rules based on an external data.

4. The method as recited in claim 3, wherein the external data is a call setup information.

5. The method as recited in claim 1, further comprising the step of sending the packet to an egress port after the packet has been processed using the one or more transformation rules.

6. The method as recited in claim 1, further comprising the step of updating the one or more identification rules and the one or more transformation rules whenever a change in the packet flow is detected.

7. The method as recited in claim 1, wherein the one or more identification rules comprise a decision tree.

8. The method as recited in claim 7, wherein the decision tree comprises one or more nodes and each node is a hash table.

9. The method as recited in claim 1, wherein each transformation rule comprises a processing instruction.

10. The method as recited in claim 1, wherein the standard process is a protocol stack.

11. The method as recited in claim 1, wherein the packet is an IP packet.

12. The method as recited in claim 1, wherein the packet is an Ethernet packet.

13. A computer program embodied on a computer readable medium for processing a packet comprising:
    a code segment for monitoring the standard process to detect one or more packet flows;
    a code segment for creating the one or more identification rules and the one or more transformation rules whenever a packet flow is detected;
    a code segment for receiving the packet;
    a code segment for processing the packet using one or more transformation rules whenever the a code segment for packet satisfies one or more identification rules; and
    a code segment for processing the packet using a standard process whenever the packet does not satisfy the one or more identification rules.

14. The computer program as recited in claim 13, wherein the one or more identification rules further comprise one or more validation rules.

15. The computer program as recited in claim 13, further comprising a code segment for creating the one or more identification rules and the one or more transformation rules based on an external data.

16. The computer program as recited in claim 15, wherein the external data is a call setup information.

17. The computer program as recited in claim 13, further comprising a code segment for sending the packet to an egress port after the packet has been processed using the one or more transformation rules.

18. The computer program as recited in claim 13, further comprising a code segment for updating the one or more identification rules and the one or more transformation rules whenever a change in the packet flow is detected.

19. The computer program as recited in claim 13, wherein the one or more identification rules comprise a decision tree.

20. The computer program as recited in claim 19, wherein the decision tree comprises one or more nodes and each node is a hash table.

21. The computer program as recited in claim 13, wherein each transformation rule comprises a processing instruction.

22. The computer program as recited in claim 13, wherein the standard process is a protocol stack.

23. The computer program as recited in claim 13, wherein the packet is an IP packet.

24. The computer program as recited in claim 13, wherein the packet is an Ethernet packet.

25. A communications switch comprising:
one or more ingress cards;
one or more control cards, each control card having at least one processor wherein each control card further comprises a fast flow forwarding controller that monitors the standard process to detect one or more packet flows, and creates the one or more identification rules and the one or more transformation rules whenever a packet flow is detected;
one or more egress cards;
a communications bus communicably coupling the ingress cards, the control cards and the egress cards together; and
each ingress card receiving one or more packets, processing each packet using one or more transformation rules whenever the packet satisfies one or more identification rules, and sending each packet to one of the processors for processing using a standard process whenever the packet does not satisfy the one or more identification rules.

26. The communications switch as recited in claim 25, wherein the one or more identification rules further comprise one or more validation rules.

27. The communications switch as recited in claim 25, wherein each control card further comprises a fast flow forwarding controller that creates the one or more identification rules and the one or more transformation rules based on an external data.

28. The communications switch as recited in claim 27, wherein the external data is a call setup information.

29. The communications switch as recited in claim 25, wherein the packets are sent to one of the egress cards after the packet has been processed using the one or more transformation rules.

30. The communications switch as recited in claim 25, wherein the fast flow-forwarding controller updates the one or more identification rules and the one or more transformation rules whenever a change in the packet flow is detected.

31. The communications switch as recited in claim 25, wherein the one or more identification rules comprise a decision tree.

32. The communications switch as recited in claim 31, wherein the decision tree comprises one or more nodes and each node is a hash table.

33. The communications switch as recited in claim 25, wherein each transformation rule comprises a processing instruction.

34. The communications switch as recited in claim 25, wherein the standard process is a protocol stack.

35. The communications switch as recited in claim 25, wherein the packet is an IP packet.

36. The communications switch as recited in claim 25, wherein the packet is an Ethernet packet.

37. A communications switch comprising:
one or more ingress cards;
one or more control cards, each control card having at least one processor wherein each control card further comprises a fast flow forwarding controller that monitors the standard process to detect one or more packet flows, and creates the one or more identification rules and the one or more transformation rules whenever a packet flow is detected;
one or more signal processing cards, each signal processing card containing an array of digital signal processors, each digital signal processor creating one or more packets and sending the one or more packets to a fast flow forwarding engine, each fast flow forwarding engine receiving the one or more packets, processing each packet using one or more transformation rules whenever the packet satisfies one or more identification rules, and sending each packet to one of the processors for processing using a standard process whenever the packet does not satisfy the one or more identification rules;
one or more egress cards;
a switch fabric communicably coupling the ingress cards, the signal processing cards, the control cards and the egress cards together; and
a TDM bus communicably coupling the ingress cards, the signal processing cards, the control cards and the egress cards.

38. The communications switch as recited in claim 37, wherein the one or more identification rules further comprise one or more validation rules.

39. The communications switch as recited in claim 37, wherein each control card further comprises a fast flow forwarding controller that creates the one or more identification rules and the one or more transformation rules based on an external data.

40. The communications switch as recited in claim 39, wherein the external data is a call setup information.

41. The communications switch as recited in claim 37, wherein the packets are sent to one of the egress cards after the packet has been processed using the one or more transformation rules.

42. The communications switch as recited in claim 37, wherein the fast flow-forwarding controller updates the one or more identification rules and the one or more transformation rules whenever a change in the packet flow is detected.

43. The communications switch as recited in claim 37, wherein the one or more identification rules comprise a decision tree.

44. The communications switch as recited in claim 37, wherein the decision tree comprises one or more nodes and each node is a hash table.

45. The communications switch as recited in claim 37, wherein each transformation rule comprises a processing instruction.

46. The communications switch as recited in claim 37, wherein the standard process is a protocol stack.

47. The communications switch as recited in claim 37, wherein the packet is an IP packet.

48. The communications switch as recited in claim 37, wherein the packet is an Ethernet packet.

* * * * *